United States Patent Office 2,946,746
Patented July 26, 1960

2,946,746

OIL-EXTERNAL EMULSION DRILLING FLUIDS

Howard F. Keller, Jr., Fullerton, Calif., assignor to Union Oil Company of California, Los Angeles, Calif., a corporation of California No Drawing. Filed Oct. 1, 1956. Ser. No. 612,963

7 Claims. (Cl. 252—8.5)

This invention relates to oil-external emulsions, and in particular concerns emulsions of the water-in-oil type comprising a polyamide emulsifying agent. It further relates to emulsion-base drilling fluids of the water-in-oil type.

Within recent years there have been developed many new technical applications for emulsions of water and oil of the type in which an oil (which may be of either vegetable or mineral origin) forms the continuous or external phase and water forms the discontinuous or internal phase. Such emulsions find wide use in the cosmetic arts, in the field of protective coatings (e.g., emulsion-base paints, wax-emulsions, leather coatings, polishes, and the like) and even in the art of drilling wells by the rotary method. In the latter instance, water-in-oil emulsions are employed as the fluid which is pumped down the drill stem of the rotary rig and around the drill bit, returning to the surface via the annular passage between the drill stem and the walls of the bore. Primarily, such drilling fluid serves to cool and lubricate the drill bit and to carry the cuttings away from the bit and up to the earth's surface. In order to prevent the loss of fluid into porous or permeable formations traversed by the bore, the fluid contains a suspended or dispersed solid material such as clay or asphalt which will plaster the walls of the base with an impermeable coating through which the liquid cannot pass. Also, in order that the fluid may exert a pressure against the walls of the base to prevent the collapse thereof, most of the drilling fluids presently employed are "weighted" by having suspended therein a high density solid such as barytes, whiting, calcined clay, calcium carbonate, etc. Commonly, it is desirable that drilling fluids have apparent densities above 75, and even above 100 lbs./cu. ft. Heretofore, however, it has been difficult to achieve satisfactorily such high apparent densities with conventional weighting agents when the liquid portion of the fluid takes the form of a water-in-oil emulsion. This arises out of the fact that such weighting agents are for the most part oleophobic, i.e., they are not readily wet by the continuous oil phase of the emulsion, and hence tend to settle out of the fluid rather than remaining substantially uniformly suspended therein. Similar difficulties are experienced in other fields where technical use is made of water-in-oil emulsions containing suspended solids.

It is accordingly an object of the present invention to provide improved emulsions of the water-in-oil type.

Another object is to provide water-in-oil emulsions which are particularly adapted to carrying normally oleophobic solids substantially uniformly suspended therein.

A further and more particular object is to provide emulsion-base drilling fluids of the water-in-oil type which are, or can be, weighted to high apparent densities with conventional oleophobic solid weighting agents.

Other objects will be apparent from the following detailed description of the invention, and various advantages not specifically referred to herein will occur to those skilled in the art upon employment of the invention in practice.

I have now found that the above and related objects may be realized in oil-external emulsions in which a high molecular weight polyamide is employed as the emulsifying agent. More particularly, I have found that polyamides of the general formula

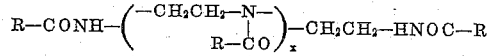

wherein R represents the residue of a fatty acid, i.e., is an alkyl or alkenyl radical containing from 11 to 21 carbon atoms, and "$x$" represents an integer from 2 to 5, inclusive, promote the formation of very stable water-in-oil emulsions, and in addition have the property of rendering normally oleophobic solid surfaces highly oleophilic. These polyamides are effective for such purpose in very small amounts, and are readily prepared from inexpensive reactants. The invention thus consists in water-in-oil emulsions in which one or a mixture of such polyamides is employed as the principle emulsifying agent. Usually, but not necessarily, such emulsions also contain a suspended solid material. A particularly preferred embodiment of the invention consists in drilling fluid emulsions in which the liquid suspending agent is a water-in-oil emulsion containing one or a mixture of the present class of polyamides and comprising a solid weighting agent and a fluid-loss additive.

The members of the present class of polyamide emulsifying agents are obtained by reacting a polyethylene polyamine of the general formula

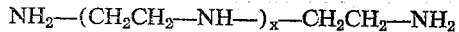

wherein "$x$" represents an integer from 2 to 5, inclusive, with sufficient of a monobasic fatty acid containing from 12 to 22 carbon atoms to react with all of the amino groups and form amides therewith. I am aware that the fatty acid soaps of polyamines are known to have emulsifying properties, but such soaps are not especially effective in forming emulsions of the water-in-oil type and do not have the important property of rendering solid surfaces highly oleophilic; furthermore, such soaps are not effective emulsifying agents in the presence of electrolytes. I am further aware that polyamines have been reacted with fatty acids to form imidazolines which have emulsifying properties. Again, however, such known emulsifying agents do not possess the desirable properties of the present class of polyamides. Accordingly, in preparing the present polyamides it is necessary to employ the fatty acid reactant in an amount at least sufficient to combine with all of the amine groups in the polyethylene polyamine reactant, and to insure that the reaction is carried out under such conditions that all of said amino groups are converted into fatty acid amide groups, i.e., under such conditions that one mole of water is removed per each amino group present in the polyethylene polyamine reactant.

The polyethylene polyamines which may be employed in preparing the present polyamides include triethylene tetramine, tetraethylene pentamine, pentaethylene hexamine, and hexaethylene heptamine. Tetraethylene pentamine is preferred. If desired, mixtures of such polyethylene polyamines may be employed. A preferred mixture of this sort is a product manufactured and sold by Carbon and Carbide Chemicals Corp. under the trade name "Polyamine H." Examples of the fatty acid reactant include lauric acid, myristic acid, palmitic acid, stearic acid, arachidic acid, behenic acid, oleic acid, linoleic acid, erucic acid, etc. Mixtures of fatty acids may also be employed.

The reaction whereby the polyamides are formed is carried out simply by heating a suitably proportioned mixture of the two reactants at a temperature between about 150° C. and about 325° C., preferably between about 180° C. and about 210° C., while distilling water from the reaction mixture. The reaction is usually complete in from 15 minutes to about 3 hours depending upon the reaction temperature and the identity of the reactants. In any particular case, however, completion of the reaction is indicated when substantially one mole of water has been distilled off per each amino group of the polyethylene polyamine reactant. If desired, the reaction may be effected in the presence of a suitably high-boiling inert reaction solvent which promotes intimate contact between the reactants and the removal of water from the reaction mixture. Ordinarily, however, the reaction proceeds smoothly in the absence of such a solvent. The polyamide products take the form of very high-boiling viscous liquids which cannot be distilled by conventional methods. Accordingly, they are usually employed directly as they are formed and without further purification. If desired, however, they may be purified by gas stripping, vacuum evaporation, or selective solvent extraction.

The following examples will illustrate the preparation of several of the polyamide emulsifying agents of the present class, but are not to be construed as limiting the invention.

*Example I*

A mixture consisting of 1128 parts by weight (4 moles) of oleic acid and 146 parts by weight (1 mole) of triethylene tetramine is heated with stirring at a temperature of 300° C. for 4 hours. The water which is evolved from the reaction mixture is condensed and collected, 70 parts by weight (3.9 moles) being collected during the 4-hour heating period. The product so obtained is essentially triethylene tetra-oleylamide:

$$C_{17}H_{33}-CO-NH-CH_2CH_2-N-CH_2CH_2-N-CH_2CH_2-NH-OC-C_{17}H_{33}$$
$$C_{17}H_{33}-CO \qquad OC-C_{17}H_{33}$$

This product is a dark brown viscous liquid which is substantially insoluble in water but readily soluble in light mineral oil.

When the procedure is repeated employing one mole of oleic acid and three moles of the triethylenetetramine, only about 1.9 moles of water are evolved from the reaction mixture and the product is 1-(aminoethyl)-aminoethyl-2-heptadecenylimidazoline:

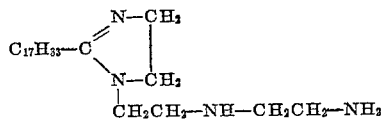

This product is readily soluble in water and only difficultly soluble in light mineral oil.

When the procedure is repeated a third time employing a 4/1 mole ratio of oleic acid to triethylene tetramine but carrying out the reaction at about 30° C. no water is evolved from the reaction mixture and the product obtained is the tetra-oleic acid salt of the triethylene tetramine:

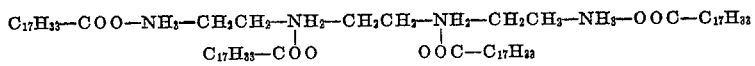

This product is soluble in water and only difficultly soluble in oil.

*Example II*

A mixture consisting of 18.9 parts by weight of tetraethylenepentamine and 140.0 parts by weight of oleic acid is heated at about 200° C. for about 0.5 hour, during which time about 8.9 parts by weight of water are evolved. The resulting product is a dark brown viscous liquid, soluble in light mineral oil and insoluble in water, and consists essentially of tetraethylene pentaoleylamide:

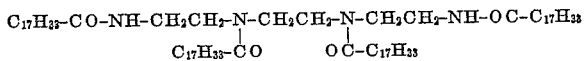

*Example III*

A mixture of 320 parts by weight of "OKO Distillate Acids" and 70 parts by weight of "Polyamine H" are heated at 210° C. for 0.5 hour to obtain a polyamide product of the present type in form of a dark brown viscous oil-soluble liquid. "OKO Distillate Acids" is a complex mixture of long-chain fatty acids of vegetable origin marketed under such name by Archer Daniels Midland Co. It has a molecular weight of about 336 and an acid number of about 167. "Polyamine H" is a mixture of polyethylene polyamines marketed under such name by Carbide and Carbon Chemicals Co. It contains 22.2 percent basic nitrogen.

In general, the water-in-oil emulsions of the present invention are prepared employing conventional emulsifying techniques. Usually, the emulsifying agent is dissolved in the oil phase (which essentially comprises a mineral, vegetable or animal oil), and the aqueous phase is gradually added to the resulting solution. The converse method of emulsification, i.e., addition of the external phase to the internal phase, and alternate addition of the two phases may likewise be employed. When the emulsion is to contain suspended solids, the latter are conventionally added to the emulsion itself rather than to one phase or the other. Any of the wide variety of slow or high speed mixers or agitators, homogenizers, colloid mills and the like may be employed to secure highly intimate dispersion of the internal aqueous phase in the external oil phase. If desired, the rate of such dispersion may be increased by operating at somewhat elevated temperatures.

In preparing the present emulsions, the emulsifying agent is of course employed in an amount sufficient to produce a stable emulsion. Such amount will depend upon the relative proportions of the oil and aqueous phases as well as upon the chemical nature of the respective phases and the particular manner in which the emulsion is prepared. Ordinarily, however, the emulsifying agent is employed in an amount representing between about 0.1 and about 5 percent of the combined weight of the two phases. The oil phase may comprise from as little as 20 percent to as much as 90 percent and the aqueous phase from 80 to 10 percent, of the combined volume of the oil and aqueous phases.

The following examples will illustrate the formulation of several types of water-in-oil emulsions within the scope of the invention, but are not to be construed as limiting the invention.

*Example IV*

| | Percent by wt. |
|---|---|
| Light mineral oil | 68.0 |
| Triethylene tetra-oleylamide | 1.2 |
| Water | 30.8 |

The emulsifying agent is dissolved in the mineral oil and the mixture is warmed to about 50° C., after which the water is added gradually with moderately rapid mechanical stirring. The resulting emulsion is useful as an oil-base furniture polish. If desired a small amount of an oil-soluble red dye may be included in the formulation. Also, to obtain higher luster, 5–10% of the oil may be replaced by a solution of carnauba or candelilla wax in naphtha.

Example V

| | Percent by wt. |
|---|---|
| Mineral oil | 40.0 |
| Tetraethylene penta-stearylamine | 0.5 |
| Water | 59.5 |

The emulsifying agent is dissolved in the oil, and the water is added gradually with stirring to obtain a light-duty emulsion cutting oil. For a heavier-duty product, all or part of the mineral oil may be replaced with sulfurized lard oil.

Example VI

| | Percent by wt. |
|---|---|
| White mineral oil | 30.0 |
| Magnesium stearate | 10.0 |
| Pentaethylene hexa-oleylamide | 1.0 |
| Titanium dioxide | 30.0 |
| Water | 29.0 |

The non-aqeuous components are thoroughly admixed and warmed to about 70° C., after which the water is added with stirring. The initial emulsion is then passed through a colloid mill to obtain a dermal protective cream.

Example VII

| | Percent by wt. |
|---|---|
| Naphtha | 10.0 |
| Mineral seal oil | 20.0 |
| Triethylene tetra-oleylamide | 0.5 |
| Diatomaceous earth | 10.0 |
| Water | 59.5 |

The emulsifier, naphtha and oil are thoroughly admixed, after which the water is added gradually with rapid stirring. The diatomaceous earth is then added to obtain an emulsified abrasive cleaner.

Example VIII

| | Percent by wt. |
|---|---|
| Light crude oil | 10.0 |
| Product of Example III | 0.5 |
| Dilute hydrochloric acid | 89.5 |

The emulsifying agent is admixed with the oil and the acid is then added to obtain an emulsified composition for use in the acid fracturing of subterranean formations.

As previously stated, the present class of emulsifying agents are especially well adapted to use in making weighted emulsion-base drilling fluids. Characteristically, such compositions comprise a liquid suspending medium consisting of a water-in-oil emulsion, a fluid-loss additive which serves to prevent the escape of the suspending medium into permeable formations traversed by the well bore, and a weighting agent to increase the density of the composition. When the present polyamide emulsifying agents are employed in forming the emulsified liquid suspending medium it is found that the drilling fluid is very stable to salt water contamination and has excellent fluid-loss properties. Moreover, the emulsifying agent has the property of rendering the surface of the weighting agent readily wet by oil so that relatively large amounts of weighting agents can be stably suspended in the composition.

In preparing the drilling fluids compositions provided by the invention the liquid suspending medium may comprise 20–90 percent by volume of oil, 10–80 percent by volume of water, and 0.1–5 percent of the emulsifying agent (based on the combined weight of water and oil). The oil component is usually of mineral origin, e.g., crude petroleum or a petroleum distillate or residuum fraction, and preferably comprises a blend of a relatively heavy oil such as a light tar, cracked residuum, heavy extract or the like and a light distillate such as gas oil or diesel fuel. Usually, such oil will have a gravity between about 12° and 40° API and a viscosity ranging from about 30 SUS at 100° F. to about 110 SSF at 122° F. The invention, however, is not limited to any particular type of oil or mixtures thereof.

The fluid-loss component is usually a hydratable clay or a clay-like material, although asphalt, carbon black and any of the fluid-loss additives commonly employed in oil- or emulsion-base drilling fluids may be employed. Very frequently local soils will contain sufficient clay to serve the purpose. On the other hand, high quality clay such as bentonite, montmorillonite and kaolinite are usually preferred in spite of their somewhat higher cost. The fluid-loss agent is employed in an amount sufficient to reduce the loss of suspending medium into permeable formations traversed by the well bore but insufficient to increase the viscosity of the composition to such a degree that it cannot readily be pumped. Such amount depends on the fluid-loss additive itself and upon the viscosity of the emulsion suspending medium, but usually corresponds to between about 2 and about 15 percent by weight of the suspending medium.

The weighting agent component (if present) may be any of the high density materials conventionally employed for this purpose, e.g., barytes, whiting, calcined clay, etc., and is employed in whatever amount is necessary to adjust the density of the composition to the desired value. Usually it is desirable that the composition have an apparent density of 65–125 lbs./cu. ft.

While no particular order of mixing need be observed in preparing the drilling fluid emulsions, it is usually most convenient first to form the emulsion suspending medium and thereafter add the fluid-loss additive and weighting agent. Preferably, the emulsifying agent is added to the oil and the aqueous phase is then gradually incorporated with rapid agitation. If desired, the initial emulsion may be then passed through a colloid mill or homogenizer, after which the fluid-loss additive is added with agitation. Finally, the weighting agent is added and the entire composition is stirred for 0.25–3 hours to insure stable suspension of the solids in the liquid phase.

The following examples illustrate the formulation and preparation of several emulsion-base drilling fluids with the scope of the invention but are not to be construed as limiting the same.

Example IX

Approximately 12 parts by weight of a 27 percent kerosene solution of the polyamide product prepared in Example III are dissolved in about 70 parts by weight of diesel fuel, and 280 parts by weight of water are added gradually with high-speed stirring. Approximately 20 parts by weight of kaolinite are then added to the resulting emulsion, and stirring is continued for about 30 minutes. The resulting composition has a 30-minute fluid-loss value of 0.0 ml. and is of pumpable viscosity. None of the kaolinite showed any tendency to settle during storage.

Example X

Approximately 12 parts by weight of a 27 percent kerosene solution of the polyamide product prepared in Example III are dissolved in about 140 parts by weight of diesel fuel, and 210 parts by weight of 3% sodium chloride brine are added with rapid stirring. Approximately 10 parts by weight of kaolinite are then added to the resulting emulsion and stirring is continued for about 30 minutes. The resulting water-in-oil drilling fluid emulsion is entirely stable and has a 30-minute fluid-loss value of only 1.2 ml.

Example XI

The procedure of Example IX is repeated, employing the triethylene tetra-oleylamide product prepared in Example I as the emulsifying agent. The resulting composition is then weighted to an apparent density of about 100 lbs./cu. ft. with barytes. The finished composition is highly stable and the weighting agent shows very little tendency to settle out of suspension. When the imidazoline product prepared in Example I is employed as the emulsifying agent, the emulsion inverts to oil-in-water form, and the weighting agent rapidly settles out. Similar unsatisfactory results are obtained when the tetra-oleic acid soap product prepared in Example I is employed as the emulsifying agent; in addition, the fluid-loss value of the composition is too high to measure.

Other modes of applying the principle of my invention may be employed instead of those explained, change being made as regards the methods or materials employed provided the compositions stated by any of the following claims, or the equivalent of each stated compositions, be obtained.

I, therefore, particularly point out and distinctly claim as my invention:

1. A drilling fluid composition comprising (1) an emulsified liquid suspending medium comprising between about 20 and about 90 percent by volume of a hydrocarbon oil as the continuous phase, between about 80 and about 10 percent by volume of water as the dispersed phase, and sufficient of a polyamide compound of the general formula:

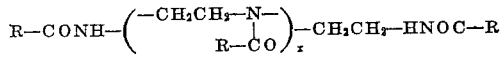

wherein R is selected from the class consisting of alkyl and alkenyl radicals containing from 11 to 21 carbon atoms and "x" represents an integer from 2 to 5, to maintain said water stably and uniformly dispersed in said oil, (2) a suspended normally oleophobic finely-divided inorganic solid weighting agent, and (3) sufficient of a fluid-loss agent to reduce the loss of said liquid suspending medium due to filtration but insufficient to increase the viscosity of the composition to such an extent that it cannot readily be pumped.

2. A composition as defined by claim 1 wherein said weighting agent is present in such an amount that the composition has an apparent density greater than about 65 lbs./cu. ft.

3. A composition as defined by claim 1 wherein, in the given formula, "x" is 3.

4. A drilling fluid composition comprising (1) an emulsified liquid suspending medium comprising between about 20 and about 90 percent by volume of a hydrocarbon oil as the continuous phase, between about 80 and about 10 percent by volume of water as the dispersed phase, and sufficient of a polyamide compound of the general formula:

R—CONH—$\left( \begin{array}{c} -CH_2CH_2-N- \\ | \\ R-CO \end{array} \right)_x$—CH$_2$CH$_2$—HNOC—R wherein R is selected from the class consisting of alkyl and alkenyl radicals containing from 11 to 21 carbon atoms and "x" represents an integer from 2 to 5, to maintain said water stably and uniformly dispersed in said oil, (2) sufficient of a hydratable clay to reduce the loss of said liquid suspending medium due to filtration but insufficient to increase the viscosity of the composition to such an extent that it cannot readily be pumped, and (3) a suspended normally oleophobic finely-divided inorganic solid in such an amount that the composition has an apparent density between about 65 and about 125 lbs./cu. ft.

5. A composition as defined by claim 4 wherein the said polyamide compound is present in an amount corresponding to between about 0.5 and about 5 percent of the combined weight of said oil and said water.

6. A composition as defined by claim 4 wherein the said clay is present in an amount representing between about 2 and about 15 percent by weight of the said liquid suspending medium.

7. A drilling fluid composition comprising (1) an emulsified liquid suspending medium comprising between about 20 and about 90 percent by volume of a hydrocarbon oil as the continuous phase, between about 80 and about 10 percent by volume of water as the dispersed phase, and between about 0.5 and about 5 percent, based on the combined weight of said oil and said water, of a polyamide compound of the general formula:

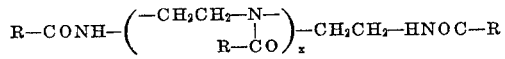

wherein R is selected from the class consisting of alkyl and alkenyl radicals containing from 11 to 21 carbon atoms and "x" represents an integer from 2 to 5; (2) between about 2 and about 15 percent, based on the weight of said liquid suspending medium, of a hydratable clay; and (3) a suspended normally oleophobic finely-divided inorganic solid in such amount that the composition has an apparent density between about 65 and about 125 lbs./cu. ft.

References Cited in the file of this patent
UNITED STATES PATENTS

| | | |
|---|---|---|
| 2,099,825 | Rolshausen et al. | Nov. 23, 1937 |
| 2,280,830 | Johnson | Apr. 28, 1942 |
| 2,347,178 | Fritz et al. | Apr. 25, 1944 |
| 2,400,001 | Grupelli | May 7, 1946 |
| 2,509,588 | Dawson | May 30, 1950 |
| 2,661,334 | Lummus | Dec. 1, 1953 |
| 2,689,219 | Menaul | Sept. 14, 1954 |
| 2,797,196 | Dunn et al. | June 25, 1957 |
| 2,802,531 | Cardwell et al. | Aug. 13, 1957 |

FOREIGN PATENTS

| | | |
|---|---|---|
| 337,368 | Great Britain | Oct. 27, 1930 |
| 657,419 | Great Britain | Sept. 19, 1951 |